US009513929B2

(12) United States Patent
Pfeifer

(10) Patent No.: US 9,513,929 B2
(45) Date of Patent: Dec. 6, 2016

(54) FOLDABLE COMPUTING DEVICE CAPABLE OF BEHAVING AS DIFFERENT TYPES OF DEVICES

(71) Applicant: Tatjana Pfeifer, Altrip (DE)

(72) Inventor: Tatjana Pfeifer, Altrip (DE)

(73) Assignee: SAP SE, Walldorf (DE)

( * ) Notice: Subject to any disclaimer, the term of this patent is extended or adjusted under 35 U.S.C. 154(b) by 268 days.

(21) Appl. No.: 13/755,340

(22) Filed: Jan. 31, 2013

(65) Prior Publication Data

US 2014/0215201 A1 Jul. 31, 2014

(51) Int. Cl.
*G06F 9/44* (2006.01)
*G06F 1/16* (2006.01)

(52) U.S. Cl.
CPC ............ *G06F 9/441* (2013.01); *G06F 1/1616* (2013.01); *G06F 1/1652* (2013.01); *G06F 9/4443* (2013.01)

(58) Field of Classification Search
CPC ...... G06F 3/041; G06F 1/1616; G06F 1/1641; G06F 1/3203
USPC ......................................................... 713/310
See application file for complete search history.

(56) References Cited

U.S. PATENT DOCUMENTS

| 6,256,017 | B1 * | 7/2001 | Bullister | 345/168 |
|---|---|---|---|---|
| 6,697,055 | B1 * | 2/2004 | Bullister | 345/168 |
| 7,826,218 | B2 * | 11/2010 | Wang | 361/679.55 |
| 8,229,522 | B2 * | 7/2012 | Kim et al. | 455/575.3 |
| 8,811,011 | B2 * | 8/2014 | Tian et al. | 361/679.55 |
| 2003/0157928 | A1 * | 8/2003 | Phillips | 455/414 |
| 2004/0052044 | A1 * | 3/2004 | Mochizuki et al. | 361/683 |
| 2005/0099361 | A1 * | 5/2005 | Majer | 345/1.3 |
| 2005/0110702 | A1 * | 5/2005 | Aoki et al. | 345/30 |
| 2006/0022950 | A1 * | 2/2006 | Friedrichs | 345/169 |
| 2006/0146488 | A1 * | 7/2006 | Kimmel | 361/681 |
| 2008/0167095 | A1 * | 7/2008 | Kim et al. | 455/575.3 |
| 2008/0285215 | A1 * | 11/2008 | Kim et al. | 361/680 |

(Continued)

OTHER PUBLICATIONS

Touch Sensors—Atmel Corporation; http://www.atmel.com/products/TouchSoutions/touch_sensors/default.aspx (last visited on Jan. 30, 2013).

(Continued)

*Primary Examiner* — Thomas Lee
*Assistant Examiner* — Santosh R Poudel
(74) *Attorney, Agent, or Firm* — Fish & Richardson P.C.

(57) ABSTRACT

The present disclosure involves methods and devices, including computer programs encoded on a computer storage medium, for providing a foldable computing device that provides multiple operating modes and is especially adaptable in size to particular functions of the operating modes. In one aspect, a foldable mobile computing device for establishing a connection with a network or for displaying an electronic document, comprising: a processor; a foldable display including a bendable material configured to emit light and including a folding axis, wherein the bendable material extends across the folding axis and the foldable display is configured to be folded with respect to the folding axis. In an aspect, the foldable device provides access to a first function of the device and to a second function different from the first function upon folding or unfolding a portion of the display with respect to the folding axis, wherein the folding or unfolding of the portion of the display with respect to the folding axis activates the second function.

14 Claims, 6 Drawing Sheets

(56) References Cited

U.S. PATENT DOCUMENTS

| | | | |
|---|---|---|---|
| 2009/0264156 A1* | 10/2009 | Burghardt et al. | 455/566 |
| 2010/0041439 A1* | 2/2010 | Bullister | 455/566 |
| 2010/0064244 A1* | 3/2010 | Kilpatrick, II | G06F 1/1616 715/773 |
| 2010/0064536 A1* | 3/2010 | Caskey et al. | 33/303 |
| 2010/0085382 A1* | 4/2010 | Lundqvist | G06F 1/1616 345/659 |
| 2010/0182265 A1* | 7/2010 | Kim et al. | 345/173 |
| 2010/0321275 A1* | 12/2010 | Hinckley et al. | 345/1.3 |
| 2011/0161710 A1* | 6/2011 | Huang et al. | 713/324 |
| 2011/0210937 A1* | 9/2011 | Kee et al. | 345/174 |
| 2011/0216064 A1* | 9/2011 | Dahl | G06F 1/1616 345/428 |
| 2011/0225366 A1* | 9/2011 | Izadi et al. | 711/118 |
| 2011/0227718 A1* | 9/2011 | Waller et al. | 340/461 |
| 2012/0113579 A1* | 5/2012 | Agata | G06F 1/1613 361/679.09 |
| 2012/0147599 A1* | 6/2012 | Shim et al. | 362/231 |
| 2012/0235894 A1* | 9/2012 | Phillips | G09G 3/36 345/156 |
| 2013/0044215 A1* | 2/2013 | Rothkopf | G06F 1/163 348/143 |
| 2013/0215088 A1* | 8/2013 | Son | G09G 5/40 345/204 |
| 2013/0296000 A1* | 11/2013 | Park et al. | 455/566 |
| 2014/0035794 A1* | 2/2014 | Chen | 345/1.3 |

OTHER PUBLICATIONS

Electronic paper, http://en.wikipedia.org/w/index.php?title=Electronic_paper&oldid=5252127(last visited Jan. 30, 2013).

OLED, http://en.wikipedia.org/w/index.php?title=OLED&oldid=535243527 (last visited Jan. 31, 2013).

* cited by examiner

FOLDABLE COMPUTING DEVICE CAPABLE OF BEHAVING AS DIFFERENT TYPES OF DEVICES

TECHNICAL FIELD

The present disclosure relates to a foldable computing device for information workers that provides multiple operating modes with associated functions.

BACKGROUND

Computing devices have taken on an expanding role in the daily life of many people. The variety of computing devices nowadays comprises desktop and laptop computers, cellular phones, smartphones, personal digital assistants, tablet computers, e-book readers and mobile players of media such as mp3 players or CD players. These devices possess different sizes of displays depending on their application. The variety of computing devices and their utilization in daily life are thereby quickly expanding.

Mobile computing devices are increasingly employed by users for private and business applications. These devices are usually handheld devices and increasingly include touch-sensitive displays of various sizes. An information or knowledge worker may use several communication devices for daily work, such as a cell phone, a smartphone, a tablet PC, a laptop, a personal computer, a netbook, a personal digital assistant, an e-book reader, a TV and/or other computing devices, e.g., other mobile or handheld computing devices. Each of the communication devices may be used for a specific purpose or application. For example, a cell phone may be used for conventional phone calls and a smartphone may be used for app- and browser-based communication, such as social networking. For example, tablet PCs may be used in circumstances when a laptop is too heavy or too large, e.g. at meetings and for organizing schedules on one's way. For example, laptops may be used for editing larger electronic documents nearby the workplace.

SUMMARY

The present disclosure describes one or more general aspects involving a foldable computing device for information workers that provides multiple operating modes with associated functions.

One or more of the following aspects of this disclosure can be embodied as methods that include the corresponding operations. One or more of the following aspects of this disclosure can be implemented in a device comprising a processor, a computer-readable medium coupled to the processor having instructions stored thereon which, when executed by the processor, cause the processor to perform operations according to the one or more of the following aspects. One or more of the following aspects of this disclosure can be implemented on a computer-readable medium having instructions stored thereon that, when executed by a processor, cause the processor to perform operations according to the one or more of the following aspects.

In a general aspect 1 of this disclosure comprises foldable computing device, comprising: a foldable display including a material configured to be folded and one or more folding axes; a processor; a computer-readable storage medium coupled to the processor having instructions stored thereon which, when executed by the processor, cause the processor to perform operations comprising: providing access to a first operating mode of the computing device; providing access to a second operating mode of the computing device upon folding or unfolding a portion of the display with respect to a first folding axis of the one or more folding axes, wherein the second operating mode is different from the first operating mode, and wherein the folding or unfolding of the portion of the display with respect to the first folding axis activates the second operating mode.

Aspect 2 according to aspect 1, wherein providing access to the first operating mode includes providing access to a first function of the computing device, and wherein providing access to the second operating mode includes providing access to a second function of the computing device (e.g., different from the first function), the first and second function are each at least one of making or receiving a phone call, sending or receiving an electronic document, activating or deactivating a software program, and connecting to or disconnecting from a network.

Aspect 3 according to aspect 2, wherein the folding or unfolding of the portion of the display with respect to the first folding axis starts the second function.

Aspect 4 according to any one of aspects 1 to 3, further comprising:
indicating, by the foldable display and before the folding or unfolding of the portion of the display with respect to the first folding axis, a notification that the second function or second operating mode will be available upon the folding or unfolding of the portion of the display with respect to the first folding axis.

Aspect 5 according to any one of aspects 1 to 4, wherein the operations are further comprising: providing access to a third function of the computing device at a third operating mode upon folding or unfolding a portion of the display with respect to a second folding axis of the one or more folding axes, wherein the folding or unfolding of the portion of the display with respect to the second folding axis activates the third function and/or third operating mode, wherein the third function is at least one of making or receiving a phone call, sending or receiving an electronic document, activating or deactivating a software program, and connecting to or disconnecting from a network.

Aspect 6 according to any one of aspects 1 to 5, wherein the one or more folding axes are two folding axes and the first folding axis is different from the second folding axis.

Aspect 7 according to any one of aspects 1 to 6, wherein during the folding or unfolding of the portion of the display with respect to the first folding axis the second function or second operating mode is started, or wherein the folding or unfolding of the portion of the display with respect to the second folding axis starts the third function.

Aspect 8 according to any one of aspects 5 to 7, wherein the third function is different from the second function, or wherein the third function is different from the first and the second function.

Aspect 9 according to any one of aspects 1 to 8, wherein the operations are further comprising: providing access to a fourth function of the computing device at a fourth operating mode upon folding or unfolding a portion of the display with respect to a third folding axis of the one or more folding axes, wherein the folding or unfolding of the portion of the display with respect to the third folding axis activates the fourth function and/or fourth operating mode, wherein the fourth function is at least one of making or receiving a phone call, sending or receiving an electronic document, activating or deactivating a software program, and connecting to or disconnecting from a network.

Aspect 10 according to aspect 9, wherein at least two (e.g., the first and second folding axes) of the first, second and third folding axes are perpendicular to each other, or wherein the fourth function is different from the third function.

Aspect 11 according to any one of aspects 8 to 9, wherein the fourth function is different from the first, second and third function.

Aspect 12 according to any one of aspects 1 to 11, wherein each of the first, second, third and fourth operating modes is one of cell phone mode, smartphone mode, tablet mode, laptop mode and newspaper mode.

Aspect 13 according to any one of aspects 1 to 12, wherein a largest side surface area of the display before each of the folding is about twice as large as a largest side surface area of the display after the folding, or wherein a largest side surface area of the display before each of the unfolding is about half as large as a largest side surface area of the display after the unfolding.

Aspect 14 according to any one of aspects 1 to 13, the operations further comprising: providing access to a fifth function of the computing device upon folding or unfolding a portion of the display with respect to a fourth folding axis of the one or more folding axes, wherein the folding or unfolding of the portion of the display with respect to the fourth folding axis activates the fourth function.

Aspect 15 according to aspect 14, wherein the fifth function is at least one of making or receiving a phone call, sending or receiving an electronic document, activating or deactivating a software program, and connecting to or decoupling from a network.

Aspect 16 according to aspect 14 or 15, wherein at least two of the first, second, third and fourth folding axes are different or the same.

Aspect 17 according to any one of aspects 14 to 16, wherein the fifth function is different from the fourth function.

Aspect 18 according to any one of aspects 14 to 17, wherein the fifth function is different from the first, second and third function.

Aspect 19 according to any one of aspects 14 to 18, the operations further comprising: indicating, by the foldable display and before any of the folding or unfolding with respect to one of the one or more folding axes, a notification that a function of the computing device will be available upon the folding or unfolding of the portion of the display with respect to the one of the one or more folding axes.

Aspect 20 according to any one of aspects 1 to 19, wherein the side surface of the display is a side surface of the computing device.

Aspect 21 according to any one of aspects 1 to 20, wherein the foldable display comprises the processor or the processor-readable medium.

Aspect 22 according to any one of aspects 1 to 21, wherein the material is a bendable monolithic material and extends across at least one of the one or more folding axes.

Aspect 23 according to any one of aspects 1 to 22, wherein the material emits light across an entire side surface of the material during operation of the display.

Aspect 24 according to any one of aspects 1 to 23, wherein the bendable material comprises at least one of organic semiconducting molecular crystal, organic polymer, single-walled carbon nanotube, inorganic nanoparticle, and thermoplastic.

Aspect 25 according to any one of aspects 1 to 24, wherein the material comprises a stretchable array or matrix of at least one of organic light-emitting diodes and inorganic light-emitting diodes.

Aspect 26 according to any one of aspects 1 to 25, wherein the computing device is a mobile computing device.

In a general aspect 27, a foldable mobile computing device for establishing a connection with a network or for displaying an electronic document, is comprising: a processor; a foldable display including a bendable material configured to emit light and including one or more folding axes, wherein the bendable material extends across at least one of the one or more folding axes and the foldable display is configured to be folded with respect to each of the one or more folding axes.

Aspect 28 according to aspect 27, wherein the bendable material is monolithic, includes the at least one of the one or more folding axes, and is configured to be folded with respect to each of the one or more folding axes, wherein the material emits light across an entire side surface of the material during operation of the foldable display.

Aspect 29 according to any one of aspects 27 to 28, wherein the bendable material comprises an organic semiconductor.

Aspect 30 according to any one of aspects 27 to 29, further comprising:

a computer-readable storage medium coupled to the processor having instructions stored thereon which, when executed by the processor, cause the processor to perform operations comprising: providing access to a first function of the computing device; providing access to a second function of the computing device different from the first function upon folding or unfolding a portion of the display with respect to a first folding axis of the one or more folding axes, wherein the folding or unfolding of the portion of the display with respect to the first folding axis activates the second function.

Aspect 31 according to aspect 30, wherein the operations are further comprising: providing access to a third function of the computing device upon folding or unfolding a portion of the display with respect to a second folding axis of the one or more folding axes, wherein the folding or unfolding of the portion of the display with respect to the second folding axis activates the third function.

Aspect 32 according to any one of aspects 30 to 31, wherein the first, second and third function may be each at least one of making or receiving a phone call, sending or receiving an electronic document, activating or deactivating a software program, and connecting to or decoupling from a network.

Aspect 33 according to any one of aspects 27 to 32, wherein the bendable material is a stretchable matrix of multiple organic light emitting diodes.

Aspect 34 according to any one of aspects 1 to 33, wherein the foldable display comprises the processor or the processor-readable medium.

Aspect 35 according to any one of aspects 1 to 34, wherein the foldable display is the foldable computing device.

Aspect 36 according to any one of aspects 1 to 35, wherein the foldable display is configured to display electronic data on only one side surface of the foldable display.

Aspect 37 according to any one of aspects 1 to 35, wherein the foldable display is configured to display electronic data on two opposing side surfaces of the foldable display.

Aspect 38 according to any one of aspects 30 to 37, the operations further comprising: indicating, by the foldable display and before the folding or unfolding of the portion of the display with respect to the first folding axis, a notification that the second function will be available upon the folding or unfolding of the portion of the display with respect to the first folding axis.

Aspect 39 according to any one of aspects 31 to 38, wherein the one or more folding axes are two folding axes and the first and second folding axis are different.

Aspect 40 according to any one of aspects 31 to 39, wherein the third function is different from the second function.

Aspect 41 according to any one of aspects 31 to 40, wherein the third function is different from the first function.

Aspect 42 according to any one of aspects 31 to 41, the operations further comprising: indicating, by the foldable display and before the folding or unfolding with respect to the second folding axis, a notification that the third function will be available upon the folding or unfolding of the portion of the display with respect to the second folding axis.

Aspect 43 according to any one of aspects 1 to 42, wherein the processor comprises an organic field-effect transistor or a thin film transistor.

Aspect 44 according to any one of aspects 27 to 43, wherein the bendable material comprises at least one of organic semiconducting molecular crystal, polymer, single-walled carbon nanotube, inorganic nanocrystal, and thermoplastic.

Aspect 45 according to any one of aspects 27 to 44, wherein the material comprises a stretchable array or matrix of at least one of organic light-emitting diodes or inorganic light-emitting diodes.

In a general aspect 46, a method implemented in a foldable computing device including a foldable display or implemented in a foldable display, the method comprising: providing access to a first function of the computing device; providing access to a second function of the computing device different from the first function upon folding or unfolding a portion of the display with respect to a first folding axis of one or more folding axes included in the foldable display, wherein the folding or unfolding of the portion of the display with respect to the first folding axis activates the second function, and wherein the first and second function are each at least one of making or receiving a phone call, sending or receiving an electronic document, activating or deactivating a software program, and connecting to or decoupling from a network.

Aspect 47 according aspect 46, wherein modified data resulting from accessing the first function remain accessible via the foldable display after the folding or unfolding of the portion of the display with respect to the first folding axis, wherein the modified data results from creating, reading, updating or deleting the data.

Aspect 48 according to any one of aspects 46 to 47, wherein the first function remains accessible via the foldable display after the folding or unfolding of the portion of the display with respect to the first folding axis.

Aspect 49 according to any one of aspects 46 to 48, wherein the first function is deactivated and not accessible after the folding or unfolding of the portion of the display with respect to the first folding axis, or wherein the second function is deactivated and not accessible before the folding or unfolding of the portion of the display with respect to the first folding axis.

Aspect 50 according to any one of aspects 46 to 49, providing access to a third function of the device upon folding or unfolding a portion of the display with respect to a second folding axis of the one or more folding axes, wherein the folding or unfolding of the portion of the display with respect to the second folding axis activates the third function, wherein the third function is at least one of making or receiving a phone call, sending or receiving an electronic document, activating or deactivating a software program, and connecting to or decoupling from a network.

Aspect 51 according to any one of aspects 46 to 50, further comprising: indicating, by the foldable display and before the folding or unfolding of the portion of the display with respect to the first folding axis, a notification that the second function will be available upon the folding or unfolding of the portion of the display with respect to the first folding axis, or indicating, by the foldable display and before the folding or unfolding of the portion of the display with respect to the second folding axis, a notification that the third function will be available upon the folding or unfolding of the portion of the display with respect to the second folding axis.

Aspect 52 according to any one of aspects 50 to 51, wherein the one or more folding axes are two folding axes and the first folding axis is different from the second folding axis.

In a general aspect 53, a computer-readable medium having computer-executable instructions stored thereon that, when executed by a processor, cause the processor to perform the operations of any one of aspects 1 to 52, Aspect 54 according to any one of aspects 1 to 53, wherein the foldable display comprises a first panel configured to display electronic data and a second panel comprising a keyboard, e.g. a touch pad comprising keyboard associated functionality.

In a general aspect 55, a mobile foldable display for establishing a connection with a network or for displaying an electronic document, comprising: a processor; a foldable material emitting light across an entire side surface of the material during operation of the foldable display, the foldable material including one or more folding axes and extending across the one or more folding axes, wherein the foldable display is configured to be folded with respect to the one or more folding axes; a computer-readable medium coupled to the processor having instructions stored thereon which, when executed by the processor, cause the processor to perform operations comprising: providing access to a first function of the display; providing access to a second function, e.g. which may be different from the first function, of the display upon folding or unfolding a first portion of the display with respect to a first folding axis of the one or more folding axes, wherein the folding or unfolding of the first portion of the display with respect to the first folding axis activates the second function; and providing access to a third function, e.g. which may be different from the second function, of the display upon folding or unfolding a second portion of the display with respect to a second folding axis of the one or more folding axes, wherein the folding or unfolding of the second portion of the display with respect to the second folding axis activates the third function.

Aspect 56 according to aspect 55, wherein the material is monolithic and is configured to be folded with respect to each of the one or more folding axes.

Aspect 57 according to any one of aspects 55 to 56, wherein the material comprises a stretchable array or matrix of at least one of organic light-emitting diodes or inorganic light-emitting diodes.

Aspect 58 according to any one of aspects 55 to 57, wherein the processor comprises an organic field-effect transistor or a thin film transistor.

Aspect 59 according to any one of aspects 55 to 58, wherein the foldable display is configured to display electronic data on only one side surface of the foldable display, or on two opposing side surfaces of the foldable display.

Aspect 60 according to any one of aspects 55 to 59, the operations further comprising: indicating, by the foldable display and before the folding or unfolding of the portion of the display with respect to the first folding axis, a notification that the second function will be available upon the folding or unfolding of the portion of the display with respect to the first folding axis.

Aspect 61 according to any one of aspects 55 to 60, wherein the one or more folding axes are two folding axes and the first and second folding axis are different.

Aspect 62 according to any one of aspects 55 to 61, the operations further comprising: indicating, by the foldable display and before the folding or unfolding with respect to the second folding axis, a notification that the third function will be available upon the folding or unfolding of the portion of the display with respect to the second folding axis.

Aspect 63 according to any one of aspects 55 to 62, wherein the foldable material comprises at least one of organic semiconducting molecular crystal, polymer, single-walled carbon nanotube, inorganic nanocrystal, and thermoplastic.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

Figure 1:
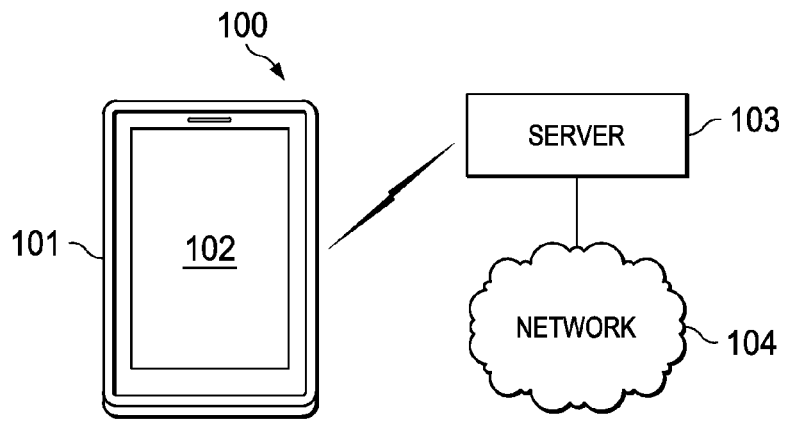
FIG. 1 illustrates an example operating environment for implementing various aspects providing a generic refresh of displayed content on a computing device.

Reference numbers and designations in the various drawings indicate exemplary aspects, implementations or embodiments of particular features of the present disclosure.

DETAILED DESCRIPTION

This disclosure generally relates to a foldable computing device for information workers that provides multiple operating modes with associated functions. Specifically, tools and methods for providing a foldable computing device that provides multiple operating modes and is especially adaptable in size to particular functions of the operating modes on the user's demand.

The subject-matter described in this disclosure can be implemented in particular embodiments so as to realize one or more of the following advantages.

First, certain aspects can allow providing various functionalities associated with multiple mobile communication devices on one single computing device.

Second, data synchronization efforts at communication devices may be reduced. For example, a user may switch between multiple operating modes of the computing device while maintaining the current function being employed by the user thereby also keeping modified data across the multiple operating modes up to date.

Third, compatibility efforts, e.g. regarding system software or hardware interfaces, between communication devices may be reduced.

Fourth, a user may access functions of multiple device operating modes, wherein the operating modes are especially adaptable in size to the accessed functions on the user's demand.

Fifth, a cognitive burden of a user of communication devices for extracting relevant information or accessing relevant functions may be reduced. Other advantages will be apparent to those skilled in the art.

An information or knowledge worker may use several communication devices for daily work, such as a cell phone, a smart phone, a tablet PC, a laptop, a personal computer, a netbook, a personal digital assistant, an e-book reader, a TV and/or other computing devices, e.g., other mobile or handheld computing devices. Each of the communication devices may be used for a specific purpose or application. For example, a cell phone may be used for conventional phone calls and a smartphone may be used for app- and browser-based communication, such as social networking or electronic messengers. For example, tablet PCs may be used in circumstances when a laptop is too heavy or too large, e.g. at meetings and for organizing schedules on one's way. For example, laptops may be used for editing larger electronic documents nearby the workplace.

However, multiple challenges arise from the employment of multiple communication devices. First, efforts to synchronize the data corpus used by a user of the multiple communication devices may be complex, expensive and time-consuming. Furthermore, there may be various different synchronization methods employed, such as push notification, pull notification or combinations thereof. Second, there may not always be compatibility ensured, because the multiple communication devices may use different operating systems. The synchronization methods may also depend on the operating system, type of communication device, application, which may increase the cognitive burden of a user of the multiple communication devices. Third, some applications may not be available for comfortable with each of the multiple communication devices. For example, some data packages may be too large to be processed or viewed by a smartphone but may be just right for a laptop. For example, placing a phone call may be available at a cell phone but not at a tablet PC. For example, a user may receive an email with an attached electronic document at a smartphone, but the attached document may be too large in size to be viewed at the smartphone without excessive navigating (e.g., scrolling, zooming or panning), whereas the document may be viewed more comfortably on a tablet PC or laptop. However, these devices may then not allow the user to place a phone call to give feedback about the document to another person. Thus, there is a need to combine multiple communication devices of various formats into one foldable computing device that allows a user to employ functions of multiple operating modes of the foldable computing device at an adequate device format.

FIG. 1 illustrates an example operating environment 100 for implementing various aspects of providing multiple operating modes of a foldable computing device 101 (e.g., comprising a foldable display). Operating environment 100 may include a server 103 and one or more networks 104, such as the Internet, public telephone network, a cellular network, a satellite network, a wireless local area network, a short-range connection network and/or the like. Foldable computing device 101 as described herein may have multiple operating modes such as, a desktop or a laptop computer modus, a cellular phone modus, a smartphone modus, a personal digital assistant modus, a tablet computer (full size or mini format) modus, an e-book reader modus, a TV modus or a media player modus (e.g., such as a mp3 player modus or a CD player modus). Foldable computing device 101 may operate within operating environment 100 using one or more of the hardware and/or software described herein. Foldable computing device 101 may be a handheld or mobile device.

In one or more aspects, foldable computing device 101 may communicate with server 103 via a wireless and/or wired network connection in one or more operating modes for the foldable computing device 101. For example, server 103 may connect to and/or communicate with foldable computing device 101 via a wireless cellular network in one or more operating modes (e.g., the cell phone or smartphone modus) for the foldable computing device 101, which may enable foldable computing device 101 to place and/or receive telephone calls. Server 103 may also connect to and/or communicate with the foldable computing device 101 in one or more operating modes of the device 101 via a wireless network to enable the foldable computing device 101 in the one or more operating modes to access a wide area network, such as the Internet. For example, foldable computing device 101 may receive and send data via the Internet 104 and display web content via its screen 102 in one or more operating modes of the device 101.

A current operating mode of the foldable computing as described herein may be defined by multiple criteria. First, the operating mode may be defined by a current size (e.g., geometric size, surface area, diagonal of a side surface) of the foldable computing device. Second, the operating mode may be defined by accessible functions at the current operating mode of the foldable computing device. For example, the term "functions" may be understood as comprising at least one of making or receiving a phone call, sending or receiving an electronic document, activating or deactivating a software program, and connecting to or decoupling from a network. Functions may also comprise types of software applications accessible by the current operating mode of the foldable computing device. Third, the operating mode may be defined by an amount of data that is received or sent.

Fourth, the operating mode may be defined by transitions in previous (e.g., lower, higher, smaller, or larger) or next (e.g., correspondingly higher, lower, larger, or smaller) operating modes of the foldable computing device. The operating modes may be distinguished from each other via their associated functions as described herein. For example, some of the operating modes may provide network connections while others do not. Alternative suitable criteria may also be used to identify and define the current operating mode in other implementations.

Figure 2:
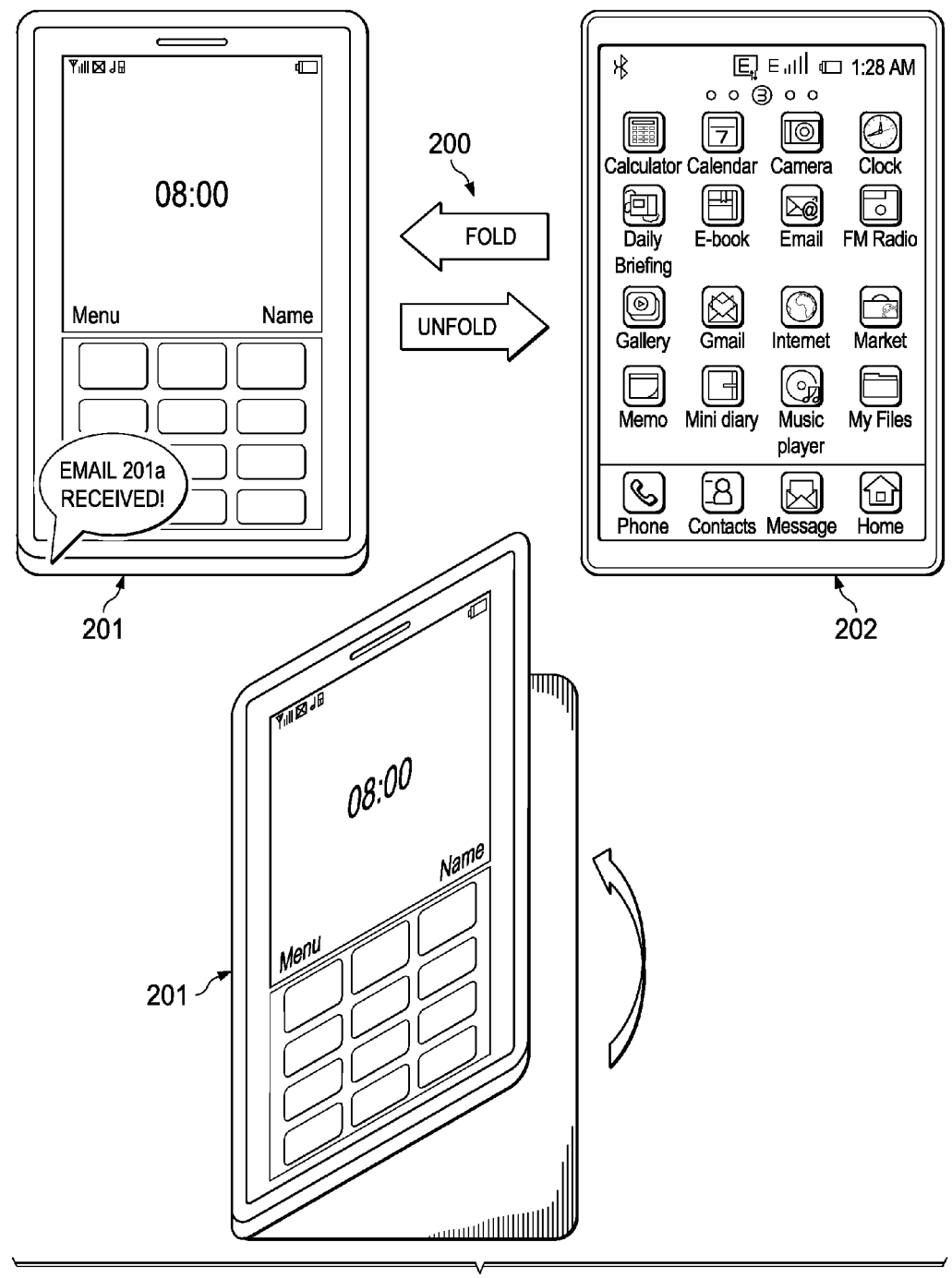
FIG. 2 illustrates exemplary transitions between a first operating mode (e.g., cell phone modus) and a second operating mode (e.g., smartphone modus).

FIG. 2 illustrates exemplary transitions 200 between a first operating mode 201 (e.g., cell phone) and a second operating mode 202 (e.g., smartphone). In an aspect, the first operating mode 201 may be an operating mode at which the foldable computing device has a geometric size and associated functions of a cell phone, while the second operating mode 202 has a geometric size and associated functions of a smartphone, which may be larger in size than the cell phone and may provide different functions as the first operating mode 201. In an aspect, the first operating mode (e.g., cell phone) may be the smallest operating mode, in size, of all available operating modes of the foldable computing device. For example, the dimensions of the largest side surface of the foldable computing device in the first operating mode may be 7 by 12 centimeter. Such a side surface of the foldable computing device in any of the operating modes of the device as described herein may be used as a display (e.g., a touch-sensitive display or touch screen on one or two opposing side surfaces) that comprises a first panel configured to display electronic data (e.g., email, text document, time, menu icons, correspondence, contacts etc.) and a second panel that is configured to provide a keyboard (e.g., a touch-sensitive screen keyboard, e.g., as a part of a touch pad).

Functions of the foldable computing device in the first operating mode 201 may comprise placing or receiving phone calls (e.g., voice-based phone calls but not video-based phone calls), voice-activated control of the menu, SMS, feed notifications, social media notifications or alerts, voice-controlled navigation (e.g., on displayed maps or via outputted voice that guides the user within a geographic area). In an aspect, software applications of the foldable computing device may provide or require only limited text input or output in the first operating mode.

In an aspect and as shown in FIG. 2, "unfolding" or "expanding" of the foldable computing device in a certain (e.g., first) start operating mode 201 to arrive at another (e.g., second) target operating mode 202 may be understood as user- or device-activated turning of a portion of the foldable computing device (e.g., a portion of a side surface) in the start operating mode by about 180 degrees away from the computing device so that a side surface of the foldable computing device at the target operating mode has not been a side surface of the foldable computing device at the start operating mode (but rather was enclosed in the foldable computing device at the start operating mode). In an aspect, "folding" or "closing" of the foldable computing device in a certain (e.g., second) start operating mode 202 to arrive at another (e.g., first) target operating mode 201 may be understood as user- or device-activated turning of a portion of the foldable computing device (e.g., a portion of a side surface) in the start operating mode by about 180 degrees towards the computing device so that a side surface of the foldable computing device at the start operating mode is not anymore a side surface of the foldable computing device at the target operating mode (but rather is then enclosed in the foldable computing device at the target operating mode).

In an aspect, the foldable computing device in a start (e.g., first) operating mode 201, 202 may indicate 201a (e.g., via a notification 201a display on a foldable display of the foldable computing device) to a user of the device that more or different functions, as defined herein, may be available for the user upon unfolding (e.g., expanding) or folding (e.g., closing) the foldable computing device rendering the foldable computing device at the target (e.g., second) operating mode 202, 201 as exemplary shown in FIG. 2. For example, some data packages may be too large to be processed or viewed by the foldable computing device in the first operating mode (e.g., cell phone) but may be adequate for the foldable computing device at the second operating mode (e.g., smartphone or tablet). For example, placing a phone call may be available at a cell phone operating mode but not receiving an email, while for the receiving of the email the smartphone operating mode may be used. However, a user may receive an email with an attached electronic document at a smartphone modus, but the attached document may be too large in size to be viewed at the smartphone modus without excessive navigating (e.g., scrolling, zooming or panning), whereas the document may be viewed more comfortably in a tablet modus or laptop modus. The tablet or laptop (e.g., second or higher operating mode) may then not allow the user to place a phone call offline (i.e., if the user is not using the Internet) to give feedback about the document to another person, which may be, however, available at the cell phone or smartphone operating mode (e.g., first or second operating mode) of the foldable computing device.

In an aspect, a transition from the first operating mode 201 of the foldable computing device to the second operating mode 202 of the foldable computing device may open the indication of further one or more functions, may activate or start the further function or may show a list of (e.g., newly) available functions (e.g., software application or hardware) available to the user after the transition from the first to the second operating mode of the foldable computing device. In an aspect, after the indication of further functions available in the second operating mode 202 the user may perform a transition (e.g., via unfolding or expanding the foldable computing device) to the second operating mode 202 of the foldable computing device, wherein the transition may automatically initiate a retrieval (e.g., via sending a request for the retrieval) of additional data related to the indication or function, e.g. the folding or unfolding may activate or start the further one or more functions which may be deactivated before the folding or unfolding. For example, a customer consultant may receive a notification at the foldable computing device at a start operating mode (e.g., first operating mode) that an address of a customer has changed. Via transition from the start operating mode to a target operating mode (e.g., a next higher operating mode, e.g., the second operating mode), a request for a retrieval of the new address of the customer is automatically sent to an external server (e.g., via a network connection such as cellular or Internet connection). The new address of the customer may be automatically retrieved or may be retrieved after an allowance by an administrator (e.g., the customer or a server). In the target operating mode of the foldable computing device, the user of the device may view the new address of the customer. For example, in the start (e.g., first) operating mode of the foldable computing device, a notification is displayed indicating that an Email or MMS has arrived. Upon folding or unfolding the foldable computing device to arrive at the target (e.g., second) operating mode of the foldable computing device, the Email or MMS is automatically (or upon a further activating of an icon by the user) displayed on the foldable display of the foldable computing device in the target (e.g., second) operating mode. For example, an ongoing navigation (e.g., only employing audio or text output for the user) taking place while the foldable computing device is in the start operating mode (e.g., first operating mode) may be augmented by visual navigation information (e.g., images of a geographic area) after a transition (e.g., via folding or unfolding) to a target operating mode (e.g., the second operating mode) of the foldable computing device.

In an aspect, the second operating mode 202 shown in FIG. 2 may be a smartphone modus. In this second operating mode, the foldable computing device may have the functions and size associated with a smartphone. In an aspect, the foldable computing device in the second operating mode 202 may have a geometric size (e.g., 14 by 12 centimeter) that is twice as large as the geometric size of the foldable computing device in the first operating mode. In an aspect, the foldable computing device in the second operating mode may provide Email communication, social media communication, editing of contacts, display of details of notifications indicated in the first operating mode, video communication, or navigation using maps displayed on the foldable display. In an aspect, further functions or information not available at the second operating mode may be indicated by links or notifications. These further functions or information may be accessible by the user of the foldable computing device upon transition (e.g., by folding or unfolding) to the next higher (e.g., third operating mode) or next lower (e.g., first operating mode) operating mode of the foldable computing device. For example, a user may view an electronic document in the second operating mode of the foldable computing device and may want to make a phone call, which may be available in the first operating mode. For example, if text or audio may be sufficient for a user for a navigation program, the user may perform a transition of the foldable computing device in the second operating mode to the first operating mode.

Figure 3:
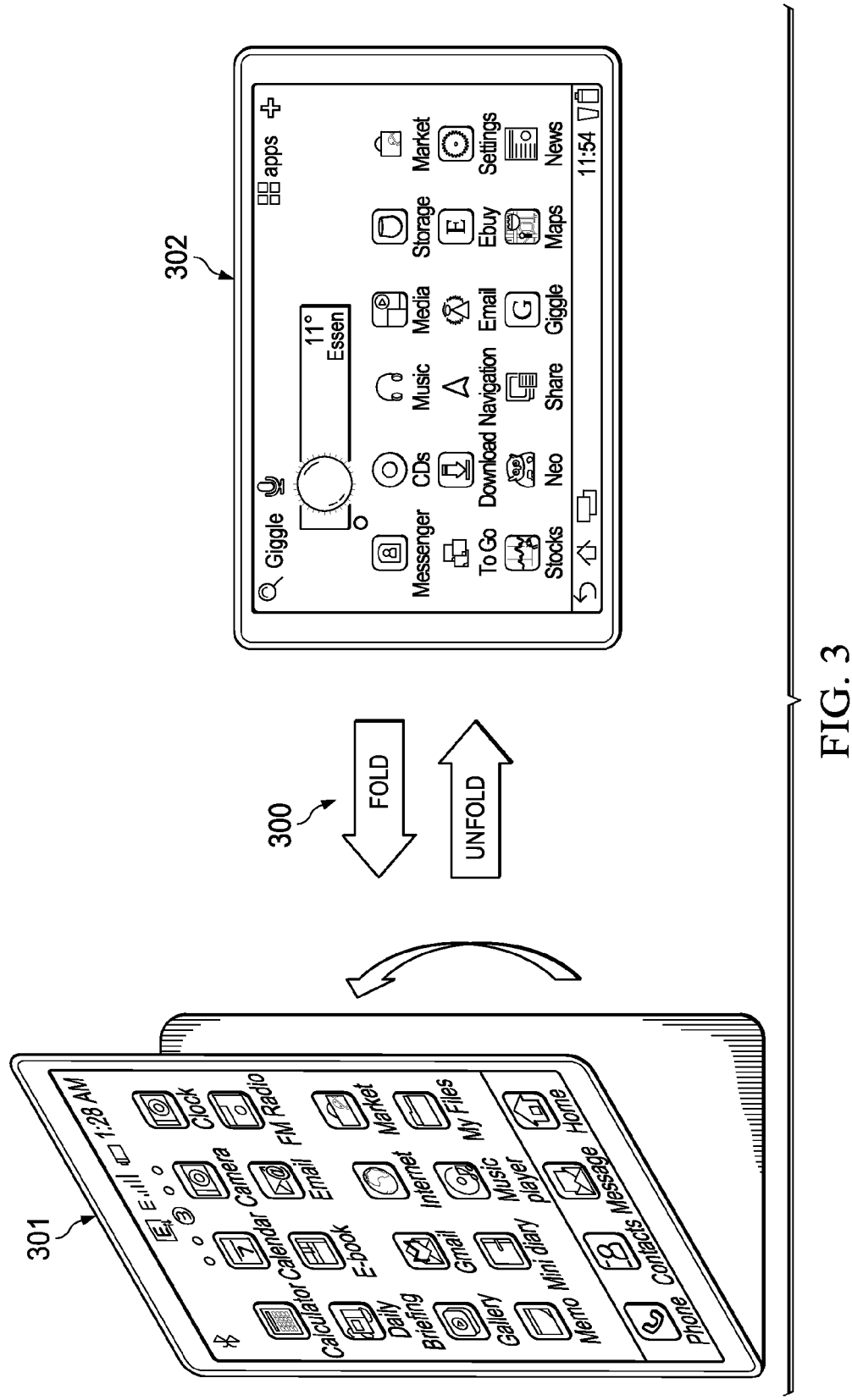
FIG. 3 illustrates exemplary transitions between a second operating mode of a foldable computing device and a third operating mode of the foldable computing device by unfolding or folding.

In an aspect, a transition 300 of the foldable computing device from the second operating mode 202, 301 (e.g., smartphone) to a third operating mode 302 (e.g., tablet) of the foldable computing device may be desired by the user or a function of the foldable computing device. FIG. 3 illustrates exemplary transitions 300 between a second operating mode 301 of the foldable computing device and a third operating mode 302 of the foldable computing device by unfolding or folding. For example, in the third operating mode the foldable computing device may be in a tablet operating mode and may provide a larger display size (e.g., twice as large as in case of the second operating mode) compared to the second operating mode of the foldable computing device. This may require less navigation efforts (e.g., through scrolling, zooming, or panning) associated with viewing an electronic document (e.g., Email, map, image, text, webpage, video etc.) on the foldable display of the foldable computing device. For example, viewing an online article (e.g., webpage) may be easier for the user in the third operating mode 302 than in the second operating mode 301.

In an aspect, the geometric size of the foldable computing device in the third operating mode may be 24 by 14 centimeter. In an aspect, the foldable computing device in the third operating mode may provide browser-based applications which might be not available in the first operating mode and/or the second operating mode or may at least be more easily accessible for the user thereby reducing the cognitive burden of the user during extraction of relevant information, e.g. by omitting excessive or any navigation. The foldable computing device in the third operating mode may provide file administration, image processing, email administration, calendar administration, reading of electronic documents (e.g., books or large business documents), or access to networks such as the Internet. In an aspect, the foldable computing device in the third operating mode may be enabled to establish a video phone connection (e.g., via cellular networks). The third operating mode may allow the user to access large amounts of data (100, 1000 or 10000 files or more).

In an aspect, the foldable computing device in a start (e.g., second) operating mode 301, 302 may indicate (e.g., via a notification display on a foldable display of the foldable computing device) to a user of the device that more or other functions may be accessible for the user upon unfolding (e.g., expanding) or folding (e.g., closing) the foldable computing device rendering the foldable computing device at the target (e.g., second) operating mode 302, 301 as exemplary shown in FIG. 3. For example, a weather forecast may be made available to the user in the third operating mode of the device but not in the second operating mode of the device. In an aspect, a transition from the third operating mode of the foldable computing device to any one of the lower operating modes (e.g., first 201 and second operating mode 301, 201) may be possible. In an aspect, the foldable computing device may skip or jump over an operating mode. For example, the foldable computing device in the third operating mode (first operating mode) may be enabled to skip or jump over the second operating mode to arrive at the first operating mode (third operating mode) through folding the foldable computing device and/or foldable display twice. In a general aspect, modified data resulting from accessing a function in a start operating mode (e.g., first, second or third operating mode) remain accessible via the foldable display after the folding or unfolding of a portion of the display or device, wherein the modified data results from creating, reading, updating or deleting the data. In an aspect, the function accessed in the start operating mode remains accessible via the foldable display after the folding or unfolding of the portion of the display. In an aspect, the function accessed in the start operating mode is not accessible and deactivated after the folding or unfolding of the portion of the display, or wherein a different function is not accessible and deactivated before the folding or unfolding of the portion of the display and is made accessible after the folding or unfolding, i.e. after arrival at the target operating mode (e.g., second, third, or first operating mode). In an aspect, all data the user modified or viewed with the foldable computing device may remain available to the user independent of the operating mode of the device the user employs, but a function (e.g., software program or network connection) employed to modify or view the data may vary depending on the operating mode of the foldable computing device. In this way, a synchronization of the data modified or viewed by the user is ensured.

Figure 4:
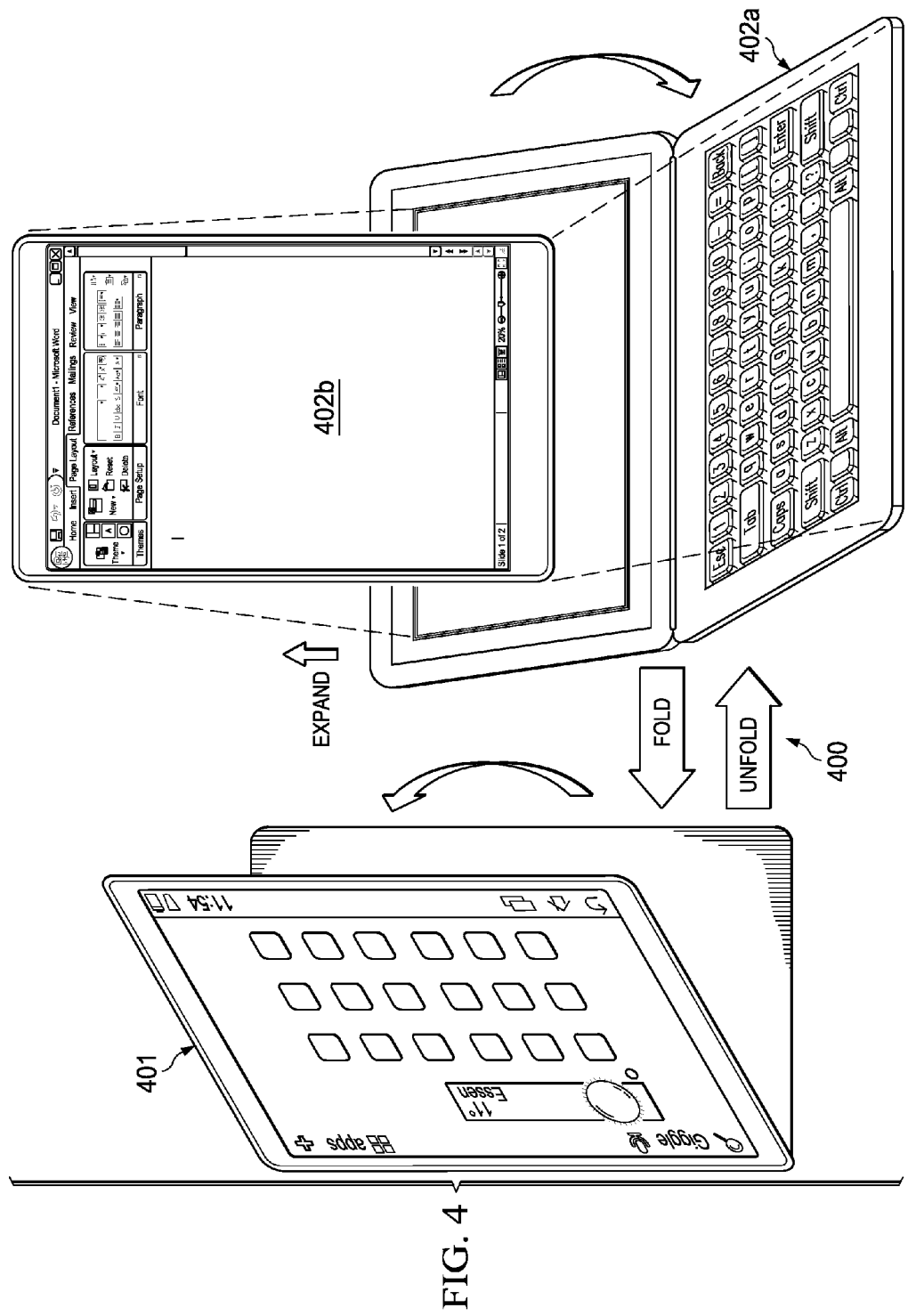
FIG. 4 illustrates exemplary transitions between a third operating mode of the foldable computing device and a fourth operating mode of the foldable computing device by unfolding or folding.

In an aspect, a transition 400 of the foldable computing device from the third operating mode 302, 401 (e.g., tablet or mini tablet) to a fourth operating mode 402 (e.g., laptop or larger tablet) of the foldable computing device may be desired by the user or a function of the foldable computing device. FIG. 4 illustrates exemplary transitions 400 between a third operating mode 401 of the foldable computing device and a fourth operating mode 402 of the foldable computing device by unfolding or folding 400. For example, in the fourth operating mode the foldable computing device may be a laptop 402a (or larger tablet 402b) and may provide a larger display size (e.g., twice as large as in case of the second operating mode) compared to the second operating mode of the foldable computing device and/or may provide an increased keyboard which might not be available at the third operating mode 401. In an aspect, the fourth operating mode may comprise two operating modes, e.g. a laptop operating mode 402a and a large tablet operating mode 402b with their own functions as described herein.

In an aspect, the fourth operating mode of the foldable computing device may be a communication device for office applications (e.g., create, read, update or delete large text or image documents). For example, in the fourth operating mode the foldable computing device may have a geometric size of about 28 by 24 centimeter. For example, in the fourth operating mode the foldable computing device may have a geometric size of about twice the geometric size of the device in the third operating mode. In an aspect, the foldable computing device in the fourth operating mode may provide similar or the same functions as in the third operating mode or may provide a combination of all functions accessible at the lower operating modes (e.g., at first, second, and third operating mode) of the foldable computing device. In an aspect, the foldable computing device in the fourth operating mode may provide modifying electronic documents, establishing network connections (e.g., cellular, LAN, or Internet connections) and exchanging messages with other entities (e.g., external server, communication devices, or handheld devices). In an aspect, the foldable computing device in the fourth operating mode may provide a large keyboard (e.g., a touch pad keyboard or a conventional keyboard with keys to push downwards), which may allow the user to perform a largest part of the work nearby a work place.

Figure 5:
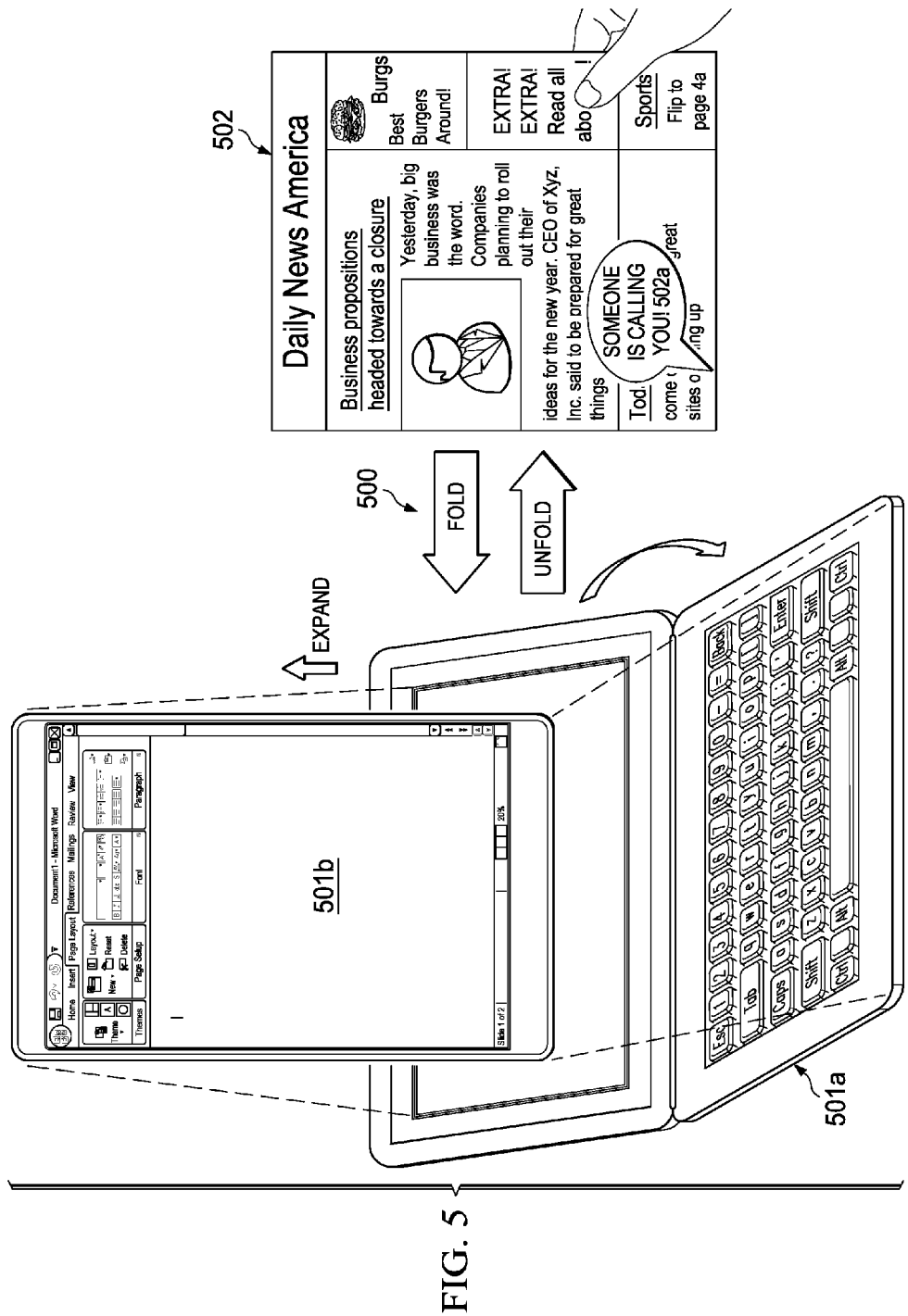
FIG. 5 illustrates exemplary transitions between the fourth operating mode of the foldable computing device and a fifth operating mode of the foldable computing device by unfolding or folding.

In an aspect, a transition 500 of the foldable computing device from the fourth operating mode 402, 501 (e.g., laptop 501a or large tablet 501b) to a fifth operating mode 502 (e.g., newspaper size) of the foldable computing device may be desired by the user or a function of the foldable computing device. FIG. 5 illustrates exemplary transitions 500 between the fourth operating mode 501 of the foldable computing device and a fifth operating mode 502 of the foldable computing device by unfolding or folding 500. For example, in the fifth operating mode the foldable computing device may be a newspaper operating mode in which the foldable computing device comprises a newspaper-sized (e.g., light-emitting or light-reflecting) display and may provide a larger display size (e.g., twice as large) compared to the fourth operating mode of the foldable computing device. In the fifth operating mode, the foldable display of the foldable computing device (e.g., the largest side surface of the foldable computing device in the fifth operating mode) may have a geometric size of about 48 by 28 centimeter, or a geometric size configured to view US letter-sized, ISO 216 A4-sized, or ISO 216 A3-sized electronic documents such as newspapers. In the fifth operating mode (e.g., newspaper mode), the foldable computing device may have the largest size but may not provide a function to establish a particular cellular connection, but may rather receive a notification that a phone call is received at a lower (e.g., first or second) operating mode of the foldable computing device; the user may then fold the computing device in the fifth mode (e.g., multiple times) to arrive at the lower operating mode that is configured to provide the user the particular cellular connection, i.e. at which the user may be enabled to speak to someone else via the particular cellular connection. The fifth operating mode of the foldable computing device may allow viewing videos or television on a screen with a size comparable to TVs. In an aspect, the fifth operating mode may be a TV and may allow connecting to television broadcasting networks to view television.

In an aspect, a transition from the fifth operating mode of the foldable computing device to any one of the lower operating modes (e.g., first 201, second 202, third 302, or fourth 402*a/b*) may be possible. In an aspect, the foldable computing device may skip or jump over one or more operating modes. For example, the foldable computing device in the fifth operating mode (first operating mode) may be enabled to skip or jump over the second, third and fourth operating mode to arrive at the first operating mode (fifth operating mode) through multiple times folding or unfolding the foldable computing device and/or foldable display. For example, when a user reads a newspaper by using the fifth operating mode of the foldable computing device, a notification 502*a* displayed on the foldable display of the fifth operating mode may indicate that an attention of the user is required at a lower operating mode, for example, the notification 502*a* may indicate that someone is calling the user and the user may then initiate (e.g., multiple) folding of the foldable computing device to arrive at a lower operating mode (e.g., the first operating mode preferably being a cell phone) to take the incoming call. In an aspect, further higher operating modes than the fifth operating mode of the foldable computing device or further lower operating modes than the first operating mode of the foldable computing device may be envisioned.

Technical implementations of the foldable computing device comprising a foldable display may be performed using one or more of the following materials as light-emitting material included in the foldable display: organic semiconducting molecular crystal (such as pentacene, diindenoperylene or phthalocyanine blue), polymer (conjugated polymer or copolymer, such as P3HT, MEH-PPV, or PCBTBT), single-walled carbon nanotube (SWNT), inorganic nanocrystals, and thermoplastic. The term "light-emitting material" or "material configured to emit light" may be understood as matter that emits light upon receiving energy (such as optical or electrical energy) and may further be understood that the material emits light across at least one entire side surface. The material may be a closed set (e.g., a closed volume) of light emitters, i.e. without any interruption within the material that is not used to emit light, on top of that, the material may be monolithic, e.g. may comprise the light-emitting material in a continuous volume. In an implementation, the light-emitting material may be bendable and configured to emit light through one of its side surfaces if the material is flat and also if the material is or was bended or folded (e.g., if a portion of the material is or was folded by about 180 degrees). In an implementation, the light-emitting material comprises an array or a matrix of at least one of organic light emitting diode (OLED) and inorganic light emitting diode (inorganic LED). In an implementation, the light-emitting material of the foldable display comprises electrophoretic electronic paper, such as e-ink or e-paper, and may be configured to reflect light, received from a light source internal or external of the material, out of the display. In an implementation, the foldable display may be a stretchable and/or bendable active matrix OLED display, e.g. comprising printable elastic conductors (e.g., using SWNTs dispersed in fluorinated rubber and/or fluorinated copolymer matrix, or using stretchable conductive ink), OLEDs, organic transistors and/or capacitors. In an implementation, a processor, power source (e.g., battery or accumulator) and/or a memory device may be included or embedded in the active matrix, for example the processor may be made of organic transistors (e.g. including polymers such as P3HT, MEHPPV, or PCBTBT, or small molecules such as pentacene or diindenoperylene). In an implementation, the active matrix may be fabricated on a flexible plastic (e.g., polyimide) film, e.g. using vacuum evaporation. For example, the active matrix may be a pixel array having a periodicity of the electronics of about 5 millimeter or less, or 1 millimeter or less. In an implementation, the active matrix may comprise an encapsulating layer (e.g., a plastic barrier layer) preventing air from penetrating into the active matrix or to the organic components. The diameter of the SWNT may be about 1 nanometer or less, with a tube length that can be millions of times longer. For example, the SWNTs may be about one millimeter long or longer, or longer than about 50 micrometer. The stretchability of the elastic conductor may be 40% or more (e.g., preferably more than 100%) and the conductivity of the elastic conductor may be 40 S cm$^{-1}$ or more. For example, SWNTs may be patterned on rubber sheets made of a silicone elastomer using screen printing through a shadow mask. For example, printed elastic conductors (e.g., SWNTs) may be sandwiched between rubber substrates for encapsulation. In an aspect, the foldable display (e.g. comprising the stretchable and bendable active matrix as described herein) may be configured to be spread over an arbitrary curved surface, e.g. the curved surface 602 resulting from folding a portion of the foldable display with respect to a folding axis towards the foldable computing device as shown in FIG. 6.

In an implementation, the foldable computing device and/or the foldable display 600 may be segmented in multiple segments 601*a-d*, wherein one or more of the multiple segments 601*a-d* may define the operating modes (e.g., first, second, third, fourth or fourth operating modes) of the foldable computing device. FIG. 6 illustrates exemplary transitions between individual operating modes of the foldable computing device 600. The foldable computing device may comprise multiple segments, wherein each segment comprises a display (e.g., a display that is or is not foldable) and multiple (e.g., four) edges 602, wherein some of the edges define folding axes 604 with respect to which a transition (e.g., folding or unfolding) between two operating modes of the foldable computing device may be performed. A central module may be included in one or more 601*d* of the segments and may comprising core components, such as the processor, the memory, or the battery. The remaining segments 601*a-c* may function as display and may not comprise any core components, these segments 601*a-c* may then be thinner than the segment 601*d* including the central module. One or more of the segments (or even all of the segments) may function as display on one or two opposing side surfaces. For example, the segment 601*d* comprising the core components may also function as display on one or two opposing sides.

Figure 6:
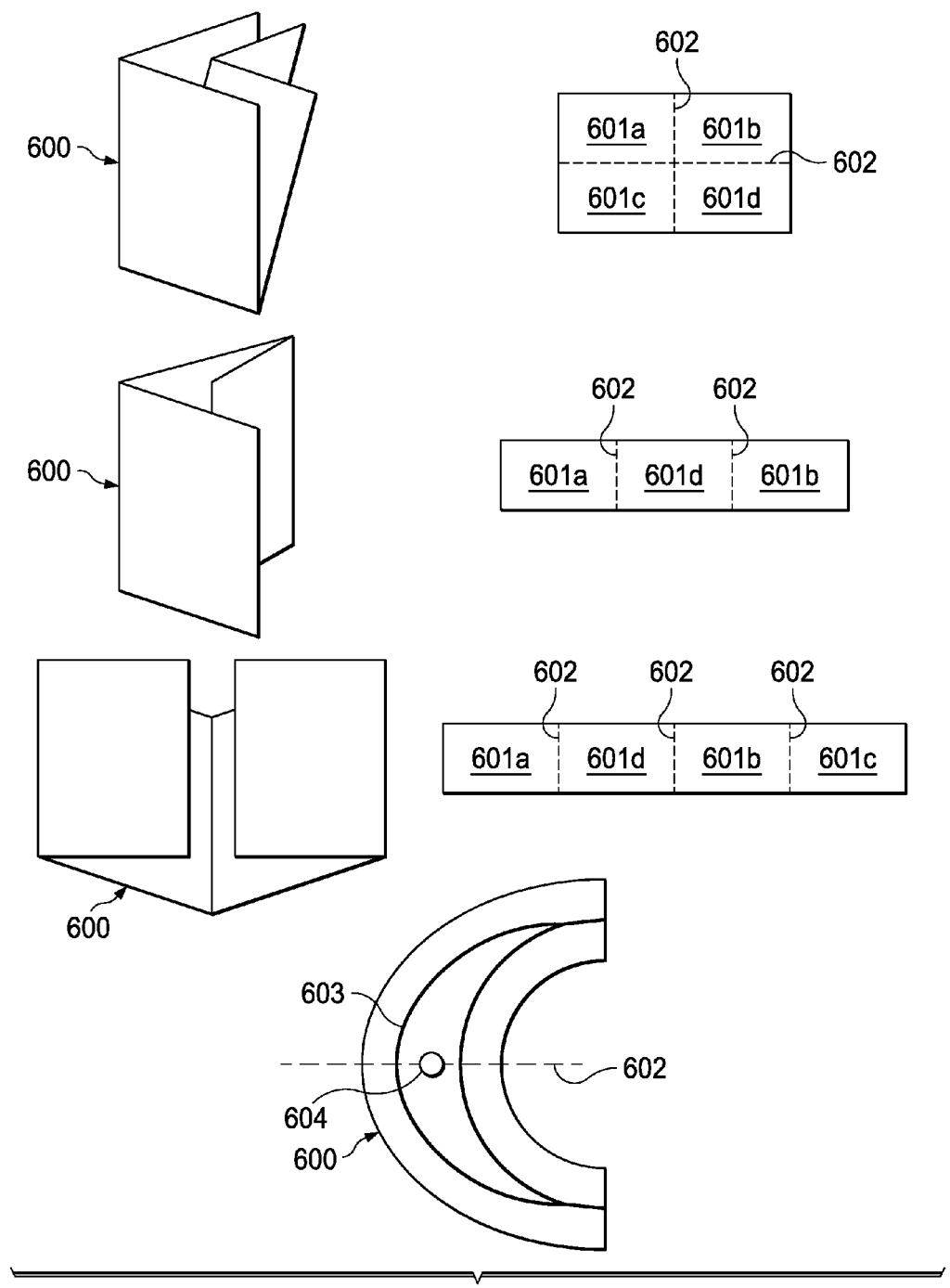
FIG. 6 illustrates exemplary implementations of transitions between individual operating modes of the foldable computing device.

At the edges 602 of the segments 601*a-d* shown in FIG. 6, the foldable computing device may comprise foldable material 603 that may or may not be part of the light-emitting material 603. For example, the foldable material 603 including the folding axes 604 may not be configured to emit light in case the segments 601*a-d* do not employ organic semiconductors to emit light (e.g., by using LCD-based technology with inorganic LEDs as light sources), or the foldable material 603 may be configured to emit light and may be the light-emitting material 603 mentioned above in case the foldable display is made of an organic light-emitting material (e.g., OLED or other organic semiconductor-based technologies mentioned above). In an implementation, the foldable computing device 600 may comprise a foldable display 600 that is made of a monolithic, bendable material 603 configured to emit light and configured to be folded, for example a monolithic foldable active matrix OLED matrix 603. In an aspect, the light-emitting material may be foldable and may extend across at least one of the one or more folding axes 604 included in the light emitting material 603, this may mean that a side surface of the light-emitting material is extending across at least one folding axis and the side surface is used to emit light for the foldable display (e.g., light is exiting the side surface). In this way (e.g., by using OLED technology for the light-emitting material), a separate bendable or foldable material at the edges 602 (or folding axes 604) may be omitted and the light-emitting material 603 may extend across the entire foldable display 600 or at least may extend across two of the segments 601a-d and across a folding axis 604 between the two segments, as shown in the cross-sectional side view of the foldable display 600 in FIG. 6. For example, the foldable computing device may be foldable with respect to any one of the folding axes 604 or with respect to any folding axis defined by the user on the user's demand (e.g., by using OLED technology as mentioned above). The foldable display may further be the foldable computing device 600, e.g., the foldable display 600 may comprise the processor, the memory, and the material configured to emit light. The power source may be external and may be connected to the foldable display or the foldable device by a cable connector. In general, the foldable computing device 600 may use one or more organic solar cells attached to one or more side surfaces (e.g., a portion of the display area) of the foldable computing device to gain power for operating the foldable computing device including the foldable display. The organic solar cell may be semi-transparent (e.g., transmit some of incoming light and absorb a fraction of the incoming light), as they may comprise conjugated polymers, organic semiconducting molecular crystals, SWNTs or other organic semiconductors. The organic solar cell may be a hybrid solar cell comprising an organic and an inorganic semiconductor (e.g., inorganic nanoparticles or nanocrystals).

Figure 7:
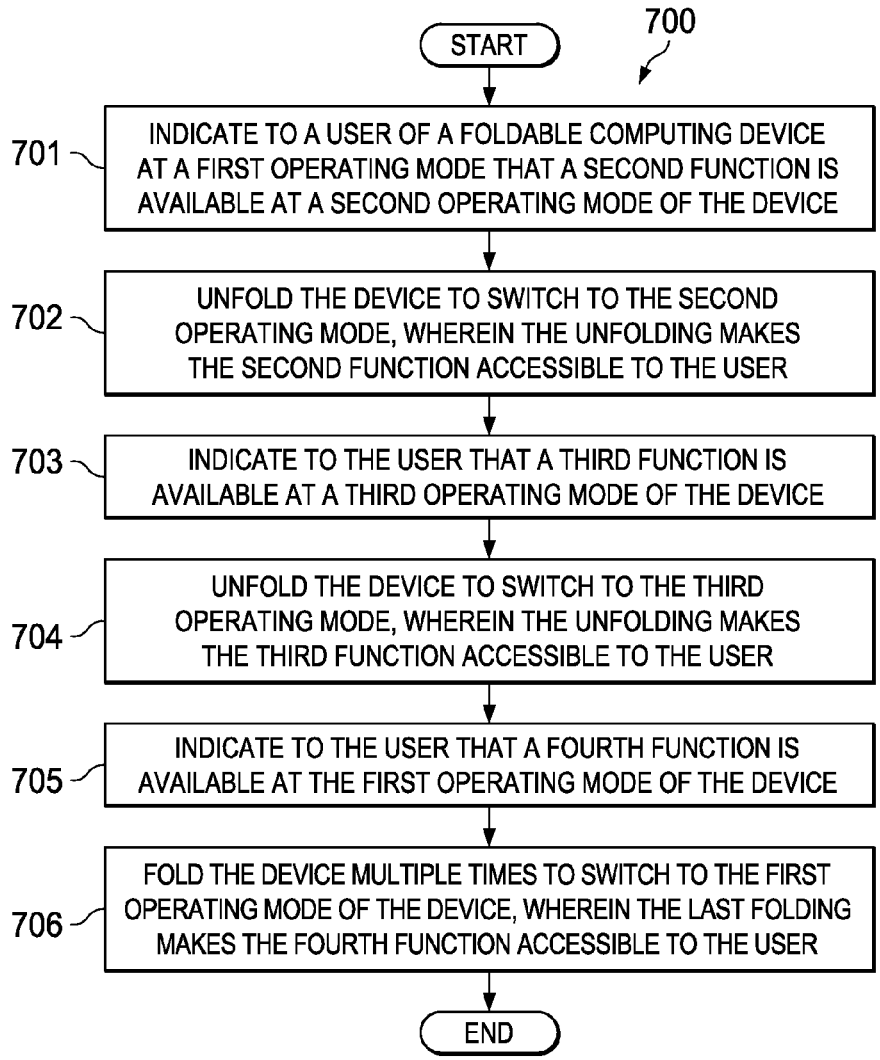
FIG. 7 illustrates an exemplary process or method for providing functions associated with operating modes of a foldable computing device.

FIG. 7 illustrates a exemplary process or method 700 for providing functions associated with operating modes of a foldable computing device to a user of the device. The user may access a first function at a first operating mode of the computing device. At 701, an indication is provided (e.g., via a notification 201a displayed at a portion of the current display) to a user of a foldable computing device at the first operating mode (e.g., cell phone operating mode) that a second function (e.g., a function different form the first function) is available at a second operating mode (e.g., smartphone or tablet operating mode as described above) of the device.

At 702, the device is unfolded (e.g., once) to switch to the second operating mode, wherein the unfolding makes the second function accessible to the user.

At 703, an indication is provided (e.g., via a notification displayed at a portion of the current display) to the user that a third function (e.g., a function different form the second function) is available at a third operating mode (e.g., a tablet, laptop, or newspaper operating mode described above) of the device.

At 704, the device is unfolded (e.g., once) to switch to the third operating mode, wherein the unfolding makes the third function accessible to the user.

At 705, an indication is provided (e.g., via a notification 502a displayed at a portion of the current display) to the user that a fourth function (e.g., a function different from the first, second, or third function) is available at the first operating mode of the device.

At 706, the device is folded multiple times (e.g., two times) to switch to the first operating mode of the device, wherein the last (e.g., second) folding makes the fourth function accessible to the user. For example, "function" may be understood as comprising at least one of making or receiving a phone call, sending or receiving an electronic document (e.g., Email, text, image, video, webpage), activating or deactivating a software program (e.g., a text-, table-, image-, or video-editing software program), and connecting to or decoupling from a network (e.g., cellular network, LAN, Internet). Function may also comprise types of software applications accessible by the current operating mode of the foldable computing device.

At a high level, computer or processor comprises an electronic computing unit (e.g., a processor) operable to receive, transmit, process, store, or manage data and information associated with an operating environment. As used in the present disclosure, the term "computer" or "processor" is intended to encompass any suitable processing device. The term "processor" is to be understood as being a single processor that is configured to perform operations as defined by one or more aspects described in this disclosure, or the "processor" comprises two or more processors, that are configured to perform the same operations, e.g. in a manner that the operations are distributed among the two or more processors. The processor may comprise multiple organic field-effect transistors or thin film transistors or a combination thereof. This may allow processing the operations in parallel by the two or more processors. The two or more processors may be arranged within a supercomputer, the supercomputer may comprise multiple cores allowing for parallel processing of the operations. For instance, computer or processor may be a desktop or a laptop computer, a cellular phone, a smartphone, a personal digital assistant, a tablet computer, an e-book reader or a mobile player of media. Furthermore, the operating environment can be implemented using any number of servers, as well as computers other than servers, including a server pool. Indeed, the computer or processor and the server may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the computer, processor and server may be adapted to execute any operating system, including Linux, UNIX, Windows, Mac OS, iOS, Android or any other suitable operating system.

The term "computing device", "server" or "processor" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array), a CUDA (Compute Unified Device Architecture) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and operating environment can realize various different computing model infrastructures.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Python and R, Perl, any suitable version of 4GL, as well as others.

The figures and accompanying description illustrate example processes and computer-implementable techniques. However, operating environment (or its software or hardware components) contemplates using, implementing, or executing any suitable technique for performing these and other processes. It will be understood that these processes are for illustration purposes only and that the described or similar techniques may be performed at any appropriate time, including concurrently, individually, or in combination. In addition, many of the steps in these processes may take place simultaneously, concurrently, and/or in different orders or combinations than shown. Moreover, operating environment may use processes with additional steps, fewer steps, and/or different steps, so long as the methods remain appropriate.

Aspects of the subject-matter and the operations described in this specification can be implemented in digital electronic circuitry, semiconductor circuits, analog circuits, or in computer software, firmware, or hardware, including the structures disclosed in this specification and their structural equivalents, or in combinations of one or more of them. Embodiments of the subject-matter described in this specification can be implemented as one or more computer programs, i.e., one or more modules of computer program instructions, encoded on computer storage medium for execution by, or to control the operation of a data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer or computer or processor may be a processor for performing actions in accordance with instructions and one or more memory devices for storing instructions and data. Generally, a computer or computer or processor will also include, or be operatively coupled to receive data from or transfer data to, or both, one or more mass storage devices for storing data, e.g., magnetic, magneto optical disks, or optical disks. However, a computer or computing device need not have such devices. Moreover, a computer or computing device can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject-matter described in this specification can be implemented on a computer having a non-flexible or flexible screen, e.g., a CRT (cathode ray tube), LCD (liquid crystal display) or OLED (organic light emitting diode) monitor, for displaying information to the user and a keyboard and a pointer, e.g., a finger, a stylus, a mouse or a trackball, by which the user can provide input to the computer. Other kinds of devices can be used to provide for interaction with a user as well; for example, feedback provided to the user can be any form of sensory feedback, e.g., touch feedback, visual feedback, auditory feedback, or tactile feedback; and input from the user can be received in any form, including acoustic, speech, touch or tactile input. In addition, a computer or computer or processor can interact with a user by sending documents to and receiving documents from a device that is used by the user; for example, by sending web pages to a web browser on a user's user device in response to requests received from the web browser.

Implementations of the subject-matter described in this specification can be implemented in a computing system that includes a back end component, e.g., as a server, or that includes a middleware component, e.g., an application server, or that includes a front end component, e.g., a user computer having a graphical user interface or a Web browser through which a user can interact with an implementation of the subject-matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some implementations, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any implementation or on the scope of what may be claimed, but rather as descriptions of features that may be specific to particular implementations of particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the operations recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A foldable computing device, comprising:
   a foldable display including a monolithic bendable material configured emit light and including two or more folding axes, wherein at least two of the two or more folding axes are substantially perpendicular to each other, wherein the bendable material comprises light-emitting material in a continuous and monolithic volume, and wherein the bendable material extends across at least two or more folding axes and the foldable display is configured to be folded only with respect to each of the two or more folding axes;
   a processor; and
   a memory coupled to the processor having instructions stored thereon which, when executed by the processor, cause the processor to perform operations comprising:
      providing access to a first operating mode of the computing device when the device is folded to a first size, wherein providing access to the first operating mode includes providing access to a first function of the foldable computing device associated with a first type of device, wherein the first size determines the first operating mode, wherein the first operating mode represents a first set of operations performed by a first type of device, and wherein the first type of device is one of a cell phone mode, smartphone mode, tablet mode, laptop mode, and newspaper mode;
      indicating, by the foldable display and before the folding or unfolding of the portion of the display with respect to a first folding axis, a notification that a second function will be available upon the folding or unfolding of the portion of the display with respect to the first folding axis; and
      providing access to a second operating mode of the computing device upon folding or unfolding a portion of the display with respect to the first folding axis of the one or more folding axes to a second size different than the first size, wherein providing access to the second operating mode includes providing access to the second function of the foldable computing device associated with a second type of device and blocking access to the first function of the computing device associated with the first type of device while oriented to the second size, wherein the second size determines the second operating mode, wherein the second operating mode is different from the first operating mode, wherein the second operating mode represents a second set of operations different than the first set of operation performed by the first type of device, wherein the second set of operations are performed by the second type of device are different than the first device.

2. The device of claim 1, wherein the first and second function are each at least one of making or receiving a phone call, sending or receiving an electronic document, activating or deactivating a software program, and connecting to or disconnecting from a network.

3. The device of claim 2, the operations further comprising:
   providing access to a a third operating mode of the computing device upon folding or unfolding a portion of the display with respect to a second folding axis of the one or more folding axes to a third size different than the first and second sizes, wherein providing access to the third operating mode includes providing access to a third function of the foldable computing device associated with a third type of device and blocking access to the first and second functions of the computing device while oriented to the third size, wherein the third size determines the third operating mode, wherein the third operating mode is different from the first and second operating modes, and wherein the third operating mode represents a third set of operations different than the first and second sets of operations.

4. The device of claim 3, wherein first folding axis is different from the second folding axis.

5. The device of claim 4, wherein the folding or unfolding of the portion of the display with respect to the first folding axis starts the second function, or wherein the folding or unfolding of the portion of the display with respect to the second folding axis starts the third function.

6. The device of claim 3, the operations further comprising:
providing access to a a fourth operating mode of the computing device upon folding or unfolding a portion of the display with respect to a third folding axis of the one or more folding axes to a fourth size different than the first, second, and third sizes, wherein providing access to the fourth operating mode includes providing access to a fourth function of the foldable computing device associated with a fourth type of device and blocking access to the first, second, and third functions of the computing device while oriented to the fourth size, wherein the fourth size determines the fourth operating mode, wherein the fourth operating mode is different from the first, second, and third operating modes, and wherein the fourth operating mode represents a fourth set of operations different than the first, second, and third sets of operations.

7. The device of claim 1, wherein the bendable material emits light across an entire side surface of the bendable material during operation of the foldable display.

8. The device of claim 1, wherein the bendable material is a stretchable matrix of multiple organic light emitting diodes.

9. A method implemented in a foldable computing device including a foldable display, the foldable display including a monolithic bendable material configured emit light and including two or more folding axes, wherein at least two of the two or more folding axes are substantially perpendicular to each other, wherein the bendable material comprises light-emitting material in a continuous and monolithic volume, and wherein the bendable material extends across at least two or more folding axes and the foldable display is configured to be folded only with respect to each of the two or more folding axes, the method comprising:
providing access to a a first operating mode of the computing device when the device is folded to a first size, wherein providing access to the first operating mode includes providing access to a first function of the foldable computing device associated with a first type of device, wherein the first size determines the first operating mode, wherein the first operating mode represents a first set of operations performed by a first type of device, and wherein the first type of device is one of a cell phone mode, smartphone mode, tablet mode, laptop mode, and newspaper mode;
indicating, by the foldable display and before the folding or unfolding of the portion of the display with respect to the first folding axis, a notification that a second function will be available upon the folding or unfolding of the portion of the display with respect to the first folding axis; and
providing access to a second operating mode of the computing device upon folding or unfolding a portion of the display with respect to a first folding axis of the one or more folding axes to a second size different than the first size, wherein providing access to the second operating mode includes providing access to a second function of the foldable computing device associated with the second type of device and blocking access to the first function of the computing device associated with the first type of device while oriented to the second size, wherein the second size determines the second operating mode, wherein the second operating mode is different from the first operating mode, wherein the second operating mode represents a second set of operations different than the first set of operation performed by the first type of device, wherein the second set of operations are performed by a second type of device different than the first device.

10. The method of claim 9 wherein modified data resulting from accessing the first function remain accessible via the foldable display after the folding or unfolding of the portion of the display with respect to the first folding axis, wherein the modified data results from creating, reading, updating or deleting the data.

11. The method of claim 9, wherein the first function is deactivated and not accessible after the folding or unfolding of the portion of the display with respect to the first folding axis, or wherein the second function is deactivated and not accessible before the folding or unfolding of the portion of the display with respect to the first folding axis.

12. The method of claim 9, further comprising:
providing access to a third operating mode of the device upon folding or unfolding a portion of the display with respect to a second folding axis of the one or more folding axes, wherein the folding or unfolding of the portion of the display with respect to the second folding axis activates the third operating mode, wherein the third operating mode activates a third function, wherein the first, second, and third functions are different.

13. The method of claim 12, wherein the first folding axis is different from the second folding axis.

14. A non-transitory computer-readable medium having computer-executable instructions stored thereon that, when executed by a processor, cause the processor to perform the operations of claim 9.

* * * * *